United States Patent Office 2,930,807
Patented Mar. 29, 1960

2,930,807

COMPLEXES OF VANADIUM HALIDES AND MONOETHYLENIC COMPOUNDS AND THEIR PREPARATION

Laura K. Case, Lafayette, Ind., assignor to E. I. du Pont de Nemours and Company, Wilmington, Del., a corporation of Delaware No Drawing. Application May 29, 1957
Serial No. 662,334

19 Claims. (Cl. 260—429)

This invention relates to new compositions of matter and to their preparation.

The organometallic compounds have attained considerable importance in recent years, especially as components of the so-called coordination catalysts. A new class of organometallic complex has now been found.

The organometallic compounds of the present invention are 1:1 and 2:1 adducts of a monoethylenic compound containing a terminal methylene group and a vanadium trihalide.

In a simple and convenient way for making the adducts of this invention, a reactor is charged with an inert solvent and the monoethylenically unsaturated compound. The charged reactor is then cooled in a solid carbon dioxide-acetone bath and a vanadium tetrahalide is added. After standing with agitation at the solid carbon dioxide-acetone bath temperature, the reaction mixture is allowed to warm to room temperature (ca. 22° C.). The solid which forms is isolated and dried.

The examples which follow are submitted to illustrate and not to limit this invention.

EXAMPLE I

*Formation of 1:1 1-heptene/$VCl_3$ complex*

To a flask containing 25 ml. of 1-heptene is added 2 ml. of vanadium tetrachloride in a nitrogen-filled dry box. A dark red color forms immediately and after an induction period of about one minute a vigorous exothermic reaction occurs with the formation of a dark solid and evolution of chlorine. After the reaction is complete, pentane is added to remove unreacted 1-heptene. The solid is separated on a filter and is then placed in a flask. Traces of residual solvent are removed by evacuation for five hours. Analysis of the dry solid shows the presence of 37.46% carbon, 6.09% hydrogen, 37.74% chlorine, and 18.21% vanadium. The product is a complex composed of approximately one molecule of 1-heptene and one molecule of vanadium trichloride.

EXAMPLE II

*Formation of 2:1 1-heptene/$VCl_3$ complex*

A reaction mixture composed of 25 ml. pentane and 25 ml. 1-heptene is placed in a flask and blanketed with nitrogen. The flask is then cooled in a solid carbon dioxide-acetone bath and to it is added 1.6 ml. of vanadium tetrachloride. A dark red color develops and chlorine is evolved. The reaction mixture is agitated for one hour at −78° C. and then allowed to warm to room temperature. During the warming period a brown solid forms. The reaction mixture is then allowed to stir at room temperature for one hour. More pentane is added and the mixture is agitated again. The product is separated in a centrifuge for three hours at 20,000 r.p.m. A solid collects in the bottom of the centrifuge tube. The supernatant liquid is discarded and the solid is transferred to a filter where most of the remaining solvent is removed. Last traces of organic solvent are removed by evacuation for a period of eight hours. Analysis of the products shows 47.94% carbon, 7.94% hydrogen, 27.26% chlorine, and 13.59% vanadium. This product is a complex composed of two molecules of 1-heptene and one molecule of vanadium trichloride. The infrared spectrum of this product shows absorption at 6.25 microns which is a shift in the olefin absorption band from the 6.09 microns observed for 1-heptene.

EXAMPLE III

*Formation of a 1:1 complex of 1-decene/$VCl_3$*

To a flask filled with dry nitrogen in a dry box is added 25 ml. of 1-decene and 2 ml. of vanadium tetrachloride. A deep red-brown solution forms and after an induction period of about one minute a vigorous exothermic reaction occurs with the production of chlorine and a solid. After standing overnight, 50 ml. of dry pentane is added to the solid and after agitation this mixture is filtered. The residue on the filter is washed several times with dry pentane and then dried by evacuation to 0.5 mm. for ten hours. By this procedure there is obtained 4.1 g. of a complex containing 40.25% carbon, 6.57% hydrogen, 34.24% chlorine, and 17.27% vanadium. This product is a 1:1 1-decene/$VCl_3$ complex. The infrared spectrum shows a band at 6.25 microns for olefin unsaturation and there is no indication of a band at 6.09 microns, which is the olefin absorption for 1-decene.

EXAMPLE IV

*Formation of 2:1 1-decene/$VCl_3$ complex*

A nitrogen-filled flask is placed in an ice bath and charged with 20 ml. of 1-decene and 1 ml. of vanadium tetrachloride. A dark red-brown color forms. The reaction mixture is stirred for one hour with cooling and then is slowly allowed to warm to room temperature with continued stirring. During this time a dark precipitate forms and chlorine is evolved. After standing overnight, 100 ml. of dry pentane is added and the suspension resulting is transferred to centrifuge tubes. The solid product is removed from the suspension by centrifuging for 2 hours at 20,000 r.p.m. The sediment is transferred to a funnel and washed with pentane. Residual amounts of solvent are removed by evacuation for ten hours at 0.5 mm. The product is found to contain 52.23% carbon, 8.56% hydrogen, 24.24% chlorine and 11.97% vanadium. It is a 2:1 1-decene/$VCl_3$ complex. The infrared spectrum of this complex is identical to that obtained with the complexes of the previous examples.

EXAMPLE V

*Formation of 1:1 1-heptene/$VCl_3$ complex*

A dry flask is placed in a dry box that was filled with nitrogen. To the flask is added 25 ml. of 1-heptene followed by addition of 1.5 ml. of vanadium tetrachloride. The deep red-brown reaction mixture so formed is swirled for about one minute when a very vigorous reaction occurs during which time a solid separates. After the reaction mixture cools to room temperature, 50 ml. of dry pentane is added and the resulting mixture is stirred thoroughly. The solid is separated on a filter and washed several times with dry pentane. Residual traces of solvent are removed by evacuation for 15 hours. The solid was found upon analysis to contain 37.45% carbon, 6.10% hydrogen, 36.09% chlorine and 18.67% vanadium. It is a complex containing approximately one molecule of 1-heptene per molecule of vanadium trichloride.

EXAMPLE VI

*Formation of 2:1 acrylonitrile/$VCl_3$ complex*

A dry flask is placed in a dry box that is filled with nitrogen and charged with 45 ml. of acrylonitrile and 4.5 ml. of vanadium tetrachloride. Mixing is done with shaking and the deep red-brown solution that forms is allowed to stand in a stoppered flask in the dry box. A green solid gradually forms and the supernatant solution from which it separates retains its deep red color. To this mixture is added 50 ml. of dry pentane. It is then stirred and filtered. The green solid collected on the filter is washed with small portions of dry pentane until the solvent emerging from the filter is colorless. Last traces of solvent are removed from the green solid by evacuation at 0.5 mm. for 10 hours. It weighs 7 g. and is a 2:1 acrylonitrile/$VCl_3$ complex. Infrared spectra show absorption bands at 6.23 microns and 4.42 microns for olefin and nitrile, respectively, as compared to corresponding value of 6.18 microns and 4.5 microns in acrylonitrile.

The unsaturated compound component of the complexes of this invention is monoethylenically unsaturated and contains a terminal methylene group. The preferred compounds of this type are those which conform to the general formula $H_2C=CRX$, in which R is halogen, hydrogen or alkyl, and X is hydrogen, alkyl, aryl, cyano, halogen, alkylcarbonyloxy, or alkoxycarbonyl. Examples of such compounds are ethylene, propylene, isobutylene, 1-pentene, 1-hexene, 1-heptene and 1-decene, styrene, vinyl acetate, vinyl chloride, vinyl chloroacetate, vinylidene chloride, vinyl fluoride, 1-chloro-1-fluoroethylene, methyl acrylate, methyl methacrylate, acrylo- and methacrylonitriles, and the like.

As illustrated by the examples, the mole ratio of monoethylenically unsaturated compound to vanadium trihalide in the complexes can be 1:1 to 2:1.

The exact nature of the complex formed from the vanadium tetrahalide and monoethylenically unsaturated compound is not known. Merely bringing the two into contact, as illustrated by the examples, appears to suffice as a method for preparing the complex.

Although the use of a liquid inert reaction medium is not essential, as a rule one is used. Suitable media are those which are normally liquid and which contain no active hydrogen, as determined by the Zerewitinoff method. Examples are the hydrocarbons such as pentane, hexane, cyclohexane, tetrahydronaphthalene, etc.

Specific vanadium tetrahalides which can be used in preparing the complexes of this invention include vanadium tetrachloride, vanadium tetrabromide, and vanadium tetrafluoride.

The complexes of this invention are new compositions and they are highly useful co-catalysts for the polymerization of ethylene. In this application they are employed in conjunction with an organo derivative of a metal from groups I–III of the periodic table of elements, i.e., an organo derivative of sodium, potassium, lithium, calcium, barium, magnesium, strontium, zinc, boron, aluminum, gallium, and indium.

Specific organo derivatives of the aforementioned metals are lithium butyl, sodium amyl, potassium ethyl, zinc dihexyl, magnesium diamyl, barium dibutyl, calcium diethyl, boron triethyl, aluminum triisobutyl, strontium dipropyl, gallium tridodecyl, lithium aluminum tetraheptyl, aluminum triethyl, phenyl magnesium bromide, methyl magnesium chloride, etc.

The use of the complexes of this invention as co-catalysts for the polymerization of ethylene is illustrated below:

A 0.05 g. portion of the heptene/vanadium trichloride complex prepared as in Example I was suspended in 25 ml. of cyclohexane. Ethylene was passed into the suspension of one hour. There was added 0.1 ml. of aluminum triisobutyl. An immediate exothermic uptake of ethylene occurred with resultant formation of solid polyethylene. The polyethylene formed had an inherent viscosity, measured at 0.125% concentration in tetrahydronaphthalene at 125° C. of 4.63.

I claim:

1. An organometallic complex of vanadium trihalide in which the halogen has an atomic number below 36 with from one to two moles, inclusive, per mole of vanadium trihalide, of a monoethylenically unsaturated compound of formula $H_2C=CRX$, where R is a radical selected from the group consisting of hydrogen, halogen and alkyl, and X is a radical selected from the group consisting of hydrogen, halogen, alkyl, aryl, alkylcarbonyloxy, alkoxycarbonyl and cyano.

2. Composition of claim 1 wherein the trihalide is trichloride.

3. Composition of claim 2 wherein the unsaturated compound is hydrocarbon.

4. Composition of claim 3 wherein the hydrocarbon is heptene.

5. An organometallic complex of $VCl_3$ and 1-heptene in 1:1 mole ratio.

6. An organometallic complex of $VCl_3$ and 1-heptene in 1:2 mole ratio.

7. Composition of claim 3 wherein the hydrocarbon is 1-decene.

8. An organometallic complex of $VCl_3$ and 1-decene in 1:1 mole ratio.

9. An organometallic complex of $VCl_3$ and 1-decene in 1:2 mole ratio.

10. Composition of claim 2 wherein the unsaturated compound is acrylonitrile.

11. An organometallic complex of $VCl_3$ and acrylonitrile in 1:2 mole ratio.

12. Process which comprises reacting a vanadium tetrahalide of halogen of atomic number below 36 with from one to two moles, per mole of said tetrahalide, of an unsaturated compound of formula $H_2C=CRX$, where R is a radical selected from the group consisting of halogen, hydrogen and alkyl and X is a radical selected from the group consisting of hydrogen, halogen, alkyl, aryl, alkylcarbonyloxy, alkoxycarbonyl and cyano and separating from the reaction mixture an organometallic complex of vanadium trihalide with from 1 to 2 moles, inclusive, per mole of vanadium trihalide, of said unsaturated compound.

13. Process of claim 12 wherein the reaction is carried out in the presence of an inert solvent for the unsaturated compound.

14. Process of claim 12 wherein the unsaturated compound is preliminarily cooled to low temperature, contacted with the vanadium tetrahalide at low temperature to form a mixture, and the mixture subsequently warmed.

15. Process which comprises reacting as the sole reactants a vanadium tetrahalide of halogen of atomic number below 36 with from one to two moles, per mole of said tetrahalide, of an unsaturated compound of formula $H_2C=CRX$ where R is a radical selected from the group consisting of halogen, hydrogen and alkyl and X is a radical selected from the group consisting of hydrogen, halogen, alkyl, aryl, alkylcarbonyloxy, alkoxycarbonyl and cyano, and recovering from the reaction mixture an organometallic complex of vanadium trihalide with from 1 to 2 moles inclusive, per mole of vanadium trihalide, of said unsaturated compound.

16. Process which comprises reacting as the sole reactants vanadium tetrachloride with from one to two moles, per mole of said tetrahalide, of a monoethylenically unsaturated hydrocarbon having a terminal methylene group, and separating from the reaction mixture an organometallic complex of vanadium trichloride with from 1 to 2 moles inclusive, per mole of vanadium trichloride, of said unsaturated hydrocarbon.

17. Process of claim 16 wherein said hydrocarbon is heptene.

18. Process of claim 16 wherein said hydrocarbon is decene.

19. Process which comprises reacting as the sole reactants vanadium tetrachloride and from one to two moles, per mole of said tetrahalide, of acrylonitrile and separating from the reaction mixture an organometallic complex of vanadium trichloride with from 1 to 2 moles inclusive of acrylonitrile.

References Cited in the file of this patent

UNITED STATES PATENTS

| | | |
|---|---|---|
| 1,893,872 | Schmidt et al. | Jan. 10, 1933 |
| 2,649,463 | Skelly | Aug. 18, 1953 |